(12) United States Patent
Carruthers et al.

(10) Patent No.: US 9,475,515 B2
(45) Date of Patent: Oct. 25, 2016

(54) MOUNTABLE SMART DEVICE HOLDER FOR A SHOPPING CART

(71) Applicant: KoupKart, LLC, East Greenbush, NY (US)

(72) Inventors: Matthew K. Carruthers, Ballston Spa, NY (US); Charles E. Bauer, Jr., East Greenbush, NY (US); Robert Peck, Queensbury, NY (US)

(73) Assignee: KOUPKART, LLC, East Greenbush, NY (US)

( * ) Notice: Subject to any disclaimer, the term of this patent is extended or adjusted under 35 U.S.C. 154(b) by 0 days.

(21) Appl. No.: 15/059,813

(22) Filed: Mar. 3, 2016

(65) Prior Publication Data

US 2016/0257330 A1 Sep. 8, 2016

Related U.S. Application Data

(60) Provisional application No. 62/127,914, filed on Mar. 4, 2015.

(51) Int. Cl.
*B62B 3/14* (2006.01)

(52) U.S. Cl.
CPC ............ *B62B 3/1424* (2013.01); *B62B 3/1416* (2013.01)

(58) Field of Classification Search
CPC .. B62B 3/1408; B62B 3/1416; B62B 3/1424

USPC ................ 280/33.992; 224/411; 248/346.01, 248/346.07

See application file for complete search history.

(56) References Cited

U.S. PATENT DOCUMENTS

| | | | |
|---|---|---|---|
| 8,474,832 B2* | 7/2013 | Mersky | B62B 3/1428 280/33.991 |
| 2010/0072715 A1* | 3/2010 | Crum | B62B 3/1408 280/33.992 |
| 2014/0263931 A1* | 9/2014 | Chen | F16M 11/041 248/576 |
| 2014/0339278 A1* | 11/2014 | Ditore | B62B 5/00 224/411 |

* cited by examiner

*Primary Examiner* — John Walters
(74) *Attorney, Agent, or Firm* — Hoffman Warnick LLC

(57) ABSTRACT

A mountable smart device holder for use on a shopping cart handle or the like. The holder includes: a front side having a generally planar surface; a lip that extends about a bottom and a side portion of the generally planar surface; a horizontal clamp and a vertical clamp proximately located in a lower corner region of the front side for holding a smart device, wherein the horizontal clamp and the vertical clamp include a lifting mechanism that raises both the horizontal clamp and the vertical clamp in response to pressing a single lever on one of the horizontal clamp and the vertical clamp; a mounting clamp affixed to the rear side of the holder, wherein the mounting clamp includes a spring loaded claw and lever element; and an opening in the generally planar surface that provides access to the lever element of the mounting clamp from the front side.

11 Claims, 5 Drawing Sheets

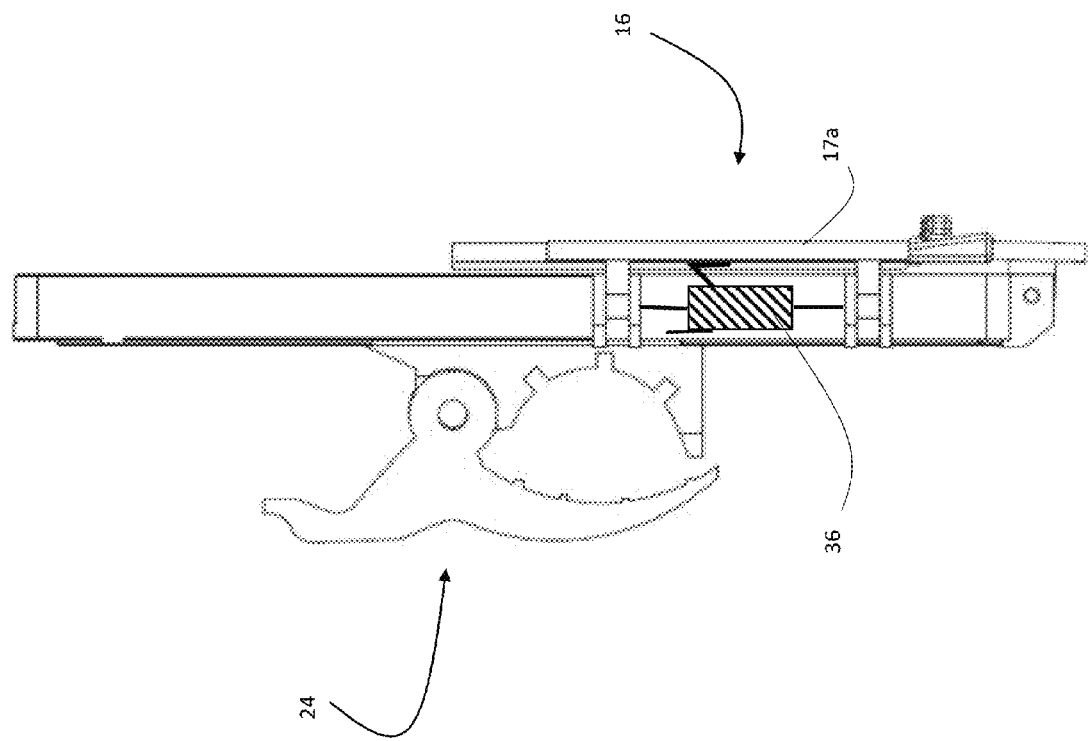

MOUNTABLE SMART DEVICE HOLDER FOR A SHOPPING CART

This application claims priority to US Provisional Application entitled MOUNTABLE SMART DEVICE HOLDER FOR A SHOPPING CART, filed on Mar. 4, 2015, Ser. No. 62/127,914, the content of which is hereby incorporated by reference.

TECHNICAL FIELD

The subject matter of this invention relates to devices for holding smart devices, and more specifically to devices for holding smart devices on shopping carts.

BACKGROUND

As smart devices, such as smart phones, tablets, etc., become more and more ingrained in the fabric of our society, demand for mechanisms for mounting and holding such devices in place have become greater and greater. In particular, there are many situations where a user requires or would prefer the freedom to have both hands free while having access to the smart device.

One such application involves shopping carts. There have been numerous attempts to create mounting mechanisms for holding smart devices in place on a shopping cart. However, none of the devices provide the flexibility and simplicity required to handle different types of devices in an easy to use and implement fashion.

SUMMARY

The present disclosure describes a mountable smart device holder that can hold various devices and is suitable for attachment to a shopping cart or the like.

A first aspect provides a mountable smart device holder, comprising: a front side having a generally planar surface; a lip that extends about a bottom and a side portion of the generally planar surface; a horizontal clamp and a vertical clamp proximately located in a lower corner region of the front side for holding a smart device, wherein the horizontal clamp and the vertical clamp include a lifting mechanism that raises both the horizontal clamp and the vertical clamp in response to pressing of a single lever on one of the horizontal clamp and the vertical clamp; a mounting clamp affixed to the rear side of the holder, wherein the mounting clamp includes a spring loaded claw and lever element; and an opening in the generally planar surface that provides access to the lever element of the mounting clamp from the front side.

In another aspect, the holder provides a clip-board style attachment system that allows various size devices to be easily held in place.

In another aspect, the holder can be displayed in either/both the forward and rearward facing directions when attached to a shopping cart handle.

BRIEF DESCRIPTION OF THE DRAWINGS

These and other features of this invention will be more readily understood from the following detailed description of the various aspects of the invention taken in conjunction with the accompanying drawings in which:

FIG. 5 shows a side view of the holder according to embodiments.

Figure 1:
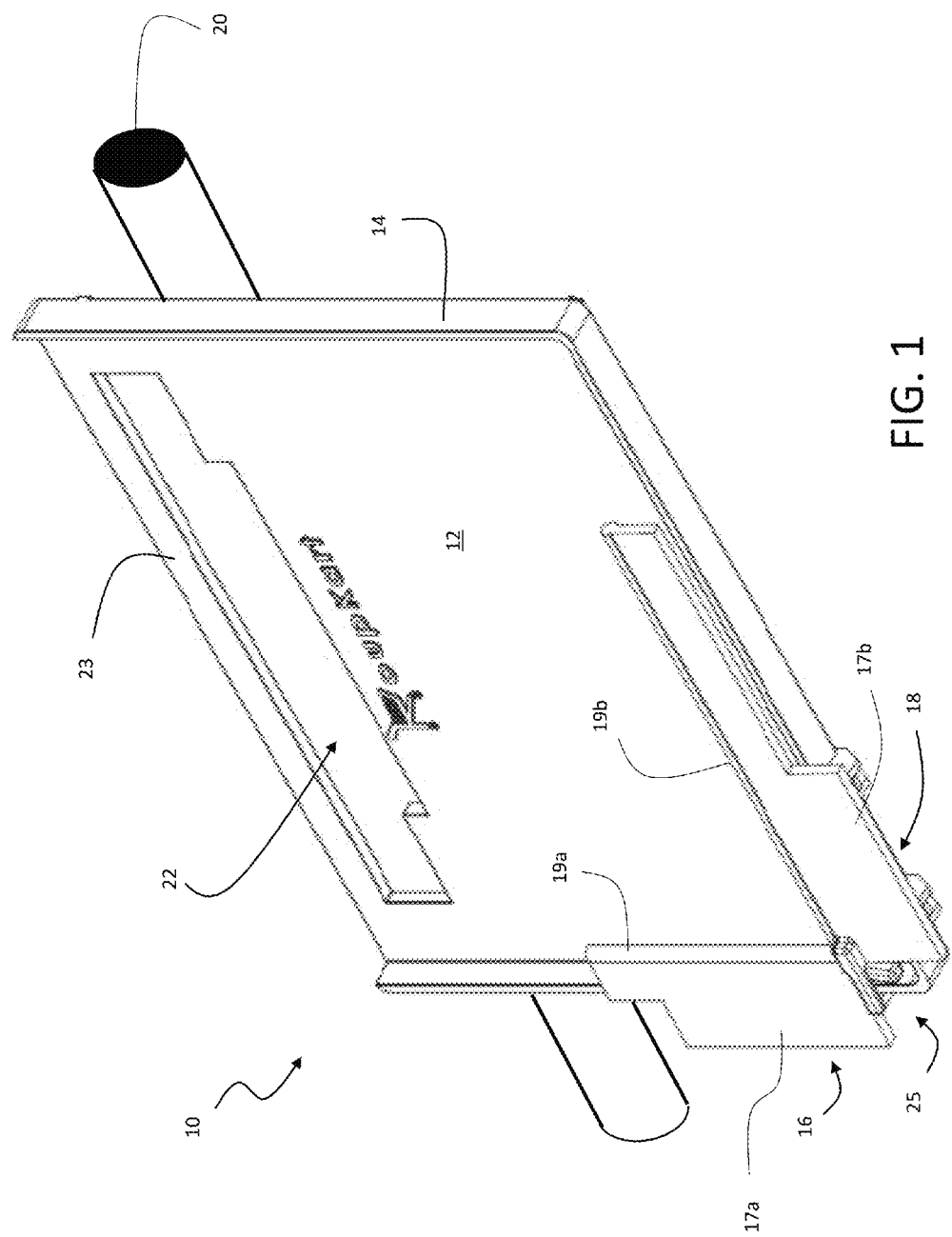
FIG. 1 shows a front isometric view of a mountable smart device holder according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a front isometric view of a mountable smart device holder 10 capable of being releasably attached to a fixture, such as a shopping cart handle 20. The front side of holder 10 includes a generally planar backrest (or surface) 12, a retaining lip 14 that extends about the bottom and at least one side edge of the backrest 12, a vertical clamp 16 and a horizontal clamp 18. In this illustrative embodiment, clamps 16 and 18 are, e.g., spring loaded, to allow a smart device to be held in place in the lower left hand corner of the holder 10. The clamps 16 and 18 provide a perpendicular "clipboard" type fasteners and, in combination with the retaining lip 14 ensure that any size smart device can be held in place within the holder 10.

The use of vertical and horizontal clamps 16, 18 allow different sized devices to be held in place without changing the configuration of the holder 10. For example, an iPhone, tablet, android device, etc., can all be accommodated by the clamps 16, 18, without regard to its size. Although described as spring loaded in this illustrative embodiment, clamps 16, 18 may be alternatively implemented in any manner to secure a smart device in a corner region of the holder, e.g., straps, magnets, adjustable snaps, clips, etc. In addition, although described as holding a smart device in a lower left hand corner, the holder 10 may configured to hold a smart device in the lower right hand corner.

As shown, clamps 16, 18 are L-shaped to include a lever 17a,b which can be depressed by the user to open the clamp, and a retaining edge 19a,b for providing spring-loaded clamping pressure onto a device.

In the illustrative embodiment, clamps 16, 18 include an integrated lifting mechanism 25 that simultaneously lifts and opens both the vertical clamp 16 and the horizontal clamp 18 when the lever 17a of vertical clamp 16 is pressed. Lifting mechanism 25 is described in further detail with reference to FIG. 3. Additionally, although shown including vertical and horizontal clamps 16, 18, it is understood that the holder 10 may be implemented with a single clamp that secures a device along a vertical axis, a horizontal axis or both.

Also shown in FIG. 1 is an open area 22 that can be utilized to facilitate mounting of the holder 10 onto a shopping cart handle 20 with a mounting clamp (not shown in FIG. 1). In particular, open area (or opening) 22 allows the user to pass their hand there through to gain access to the mounting clamp for attachment to handle 20. As shown, open area 22 comprises an enclosed opening formed within the backrest 12. Open area 22 may be any shape, e.g., rectangular, stepped as shown, oval, etc. Alternatively, open area 22 may be left unbounded along the top edge (by not including top edge 23) to allow for additional access to the mounting clamp.

Figure 2:
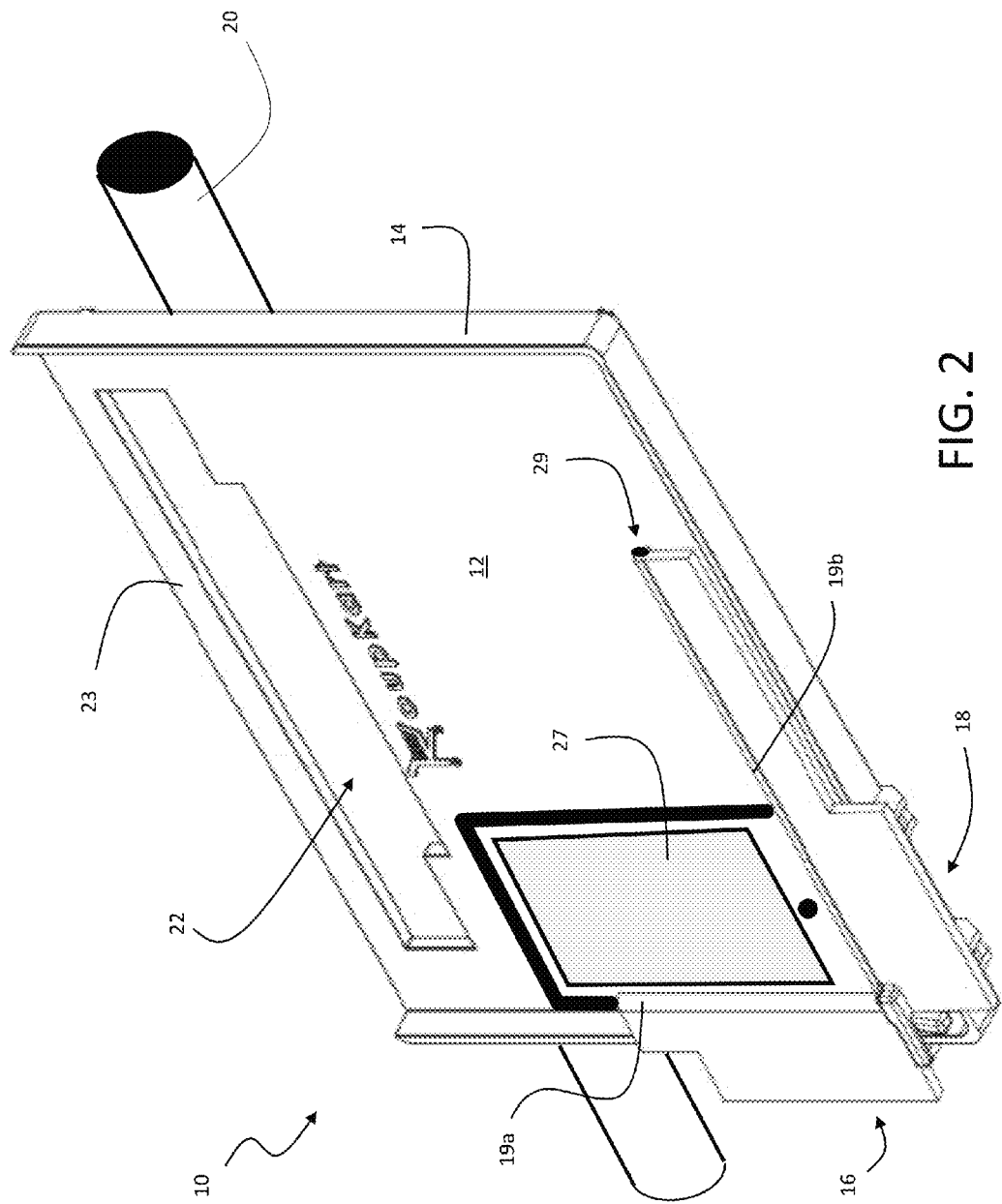
FIG. 2 shows a front isometric view of a mountable smart device holder with a smart device according to embodiments.

FIG. 2 depicts the holder of FIG. 1 with a smart device (e.g., a smart phone) 27 mounted therein. As can be seen, the smart device 27 is situated in the bottom corner and is secured beneath the retaining edges 19a,b of clamps 16, 18. Retaining edges 19a,b may include a rubber (or other gripping surface) element 29 that runs along an underside of retaining edges 19a,b to help secure the smart device in place.

Figure 3A:
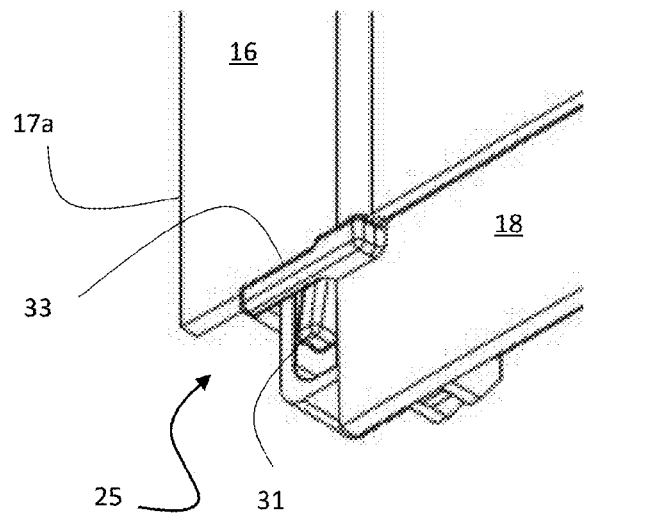
FIGS. 3A and 3B show details of the mounting clamp according to embodiments.
Figure 3B:
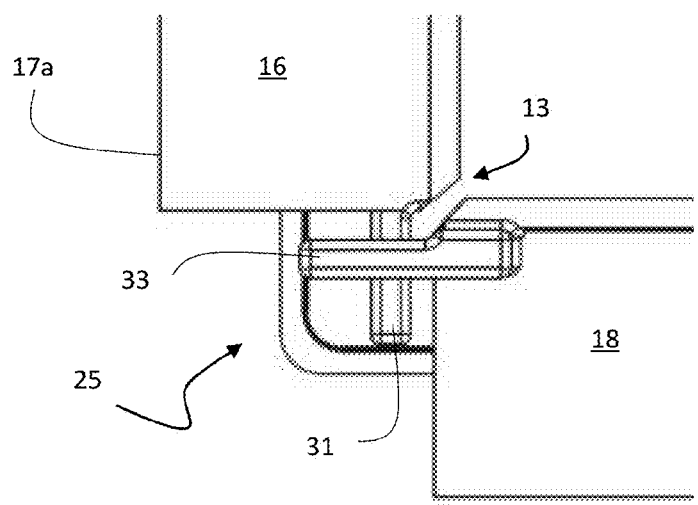

FIGS. 3A and 3B further show the lifting mechanism 25 in an isometric and plan view, respectively. Lifting mechanism 25 includes a first protruding element 31 that extends from vertical clamp 16 and a second protruding element 33 that extends from horizontal clamp 18. In the illustrative arrangement, first protruding element 31 is seated beneath the second protruding element 33. In this configuration, when the vertical clamp 16 is lifted to the open position, the first protruding element 31 engages and lifts the second protruding element 33, which in turn lifts and opens the horizontal clamp 18. Thus, the user need only press one single lever 17a on the vertical clamp 16 to open both the vertical clamp 16 and horizontal clamp 18. It is understood that the protruding elements 31, 33 may be reversed so that the horizontal clamp 18 is used to open both the horizontal clamp 18 and vertical clamp 16.

As shown in FIG. 3B, part of the vertical clamp 16 and horizontal clamp 18 may include mitered corners 13. The miter 13 allows the vertical clamp 16 and horizontal clamp 18 to provide a near seamless perpendicular holding mechanism.

Figure 4:
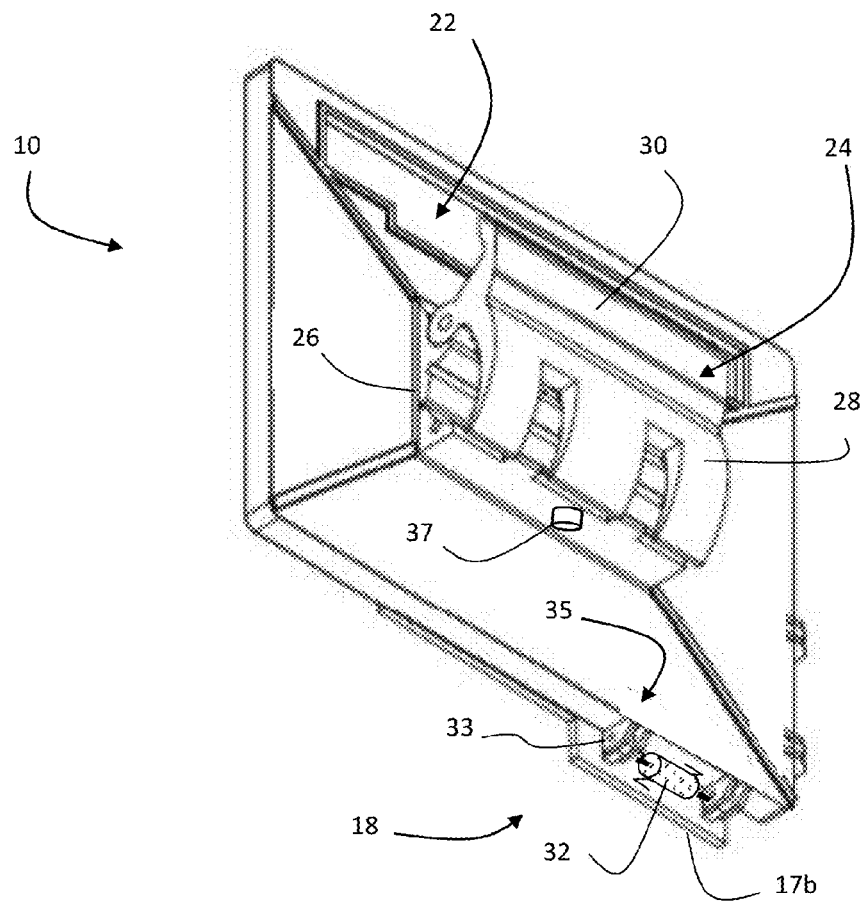
FIG. 4 shows a rear isometric view of the holder according to embodiments.

FIG. 4 depicts a rear isometric view of the holder 10. As shown, holder 10 includes a mounting clamp 24 that generally includes a first section 26 that is fixedly mounted to the back of the holder 10 and a second section that is, e.g., hingedly mounted to the first section 26 in a spring loaded fashion. Second section generally includes a claw element 28 and a lever element 30.

Pressing the lever element 30 opens the claw element 28, which allows the mounting clamp 24 to be releasably mountable to a shopping cart handle 20 or the like. Both the interior of the claw region 28 and first section 26 may be semicircular in profile, include grooves for improved gripping, and optionally include a rubber surface for further improved gripping. A locking mechanism 37 (e.g., a key/lock) may be provided within the mounting clamp 24 to more permanently keep the holder 10 affixed a shopping cart handle 20.

As noted, opening 22 provides front-side access for the user's hand to easily grasp the lever element 30 of the mounting clamp 24 and attach it to a shopping cart handle 20 (not shown in FIG. 4).

Also shown in FIG. 4 is the rear side of horizontal clamp 18 that is spring mounted to mounting elements 35 with a pivot rod 33. Mounted along pivot rod 33 is a spring 32 that biases the horizontal clamp 18 to a closed position when no front-side pressure is exerted on lever 17a. The spring 32 is biased with sufficient pressure to hold a device in the horizontal clamp 18.

A similar spring mount configuration is provided for the vertical clamp 16 as well, which can be seen in FIG. 5. As shown, spring 36 biases vertical clamp 16 to a closed position when no front-side pressure is exerted onto lever 17a.

Because of the simple design of the holder 10, it can be easily mounted onto a shopping cart handle to face outward from the cart for use by the operator pushing the cart, or face inward for use by a child in the child seat, thus allowing an infant to use the device while the operator pushes the cart. To accommodate forward and rearward facing implementations the user can simply un-mount and remount the holder 10 in the desired direction. In an alternative embodiment, the mounting clamp 24 may for example incorporate a ball and socket connector or the like that allows the user to pivot the holder to the desired direction without detachment.

Holder 10 thus provides a simple, portable system for mounting different sized smart devices to a shopping cart or the like. Installation is as follows. First, (1) the user passes their hand through the opening 22 and mounts the holder 10 onto the handle 20 by grasping and releasing the mounting clamp 24, (2) the user depresses the vertical lever 17a to open both the vertical and horizontal clamps 16,18, (3) the user places the smart device in the holder 10 beneath the vertical and horizontal edges 19a,b, and (4) the user releases the vertical lever 17a to secure the device beneath the vertical and horizontal clamps 16, 18. In a traditional shopping cart setting, the holder 10 can be easily implemented to face towards the operator or face towards an infant passenger of the cart without interfering with the operation of the cart.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A mountable smart device holder, comprising:
a front side having a generally planar surface;
a lip that extends about a bottom and a side portion of the generally planar surface;
a horizontal clamp and a vertical clamp proximately located in a lower corner region of the front side for holding a smart device, wherein the horizontal clamp and the vertical clamp include a lifting mechanism that raises both the horizontal clamp and the vertical clamp in response to pressing of a single lever on one of the horizontal clamp and the vertical clamp;
a mounting clamp affixed to the rear side of the holder, wherein the mounting clamp includes a spring loaded claw and lever element; and
an opening in the generally planar surface that provides access to the lever element of the mounting clamp from the front side.

2. The mountable smart device of claim 1, wherein the lip extends along both side portions of the generally planar surface.

3. The mountable smart device of claim 1, wherein the lifting mechanism comprises:
a first protruding element extending from the vertical clamp; and
a second protruding element extending from the horizontal clamp;
wherein the first and second protruding elements are overlaid.

4. The mountable smart device of claim 3, where in the first protruding element and second protruding element are substantially perpendicular.

5. The mountable smart device of claim 1, wherein the vertical clamp and horizontal clamp are L-shaped.

6. The mountable smart device of claim 5, wherein each of the vertical clamp and horizontal clamp include a lever and a retaining edge.

7. The mountable smart device of claim 6, wherein the retaining edge includes a rubber that runs along an underside to provide additional gripping of the smart device.

8. The mountable smart device of claim 1, wherein the opening is rectangular.

9. The mountable smart device of claim 1, wherein the opening comprises a notch that is opened along a top side.

10. The mountable smart device of claim 1, wherein the vertical clamp and horizontal clamp are mitered proximate a point at which they meet in the lower corner region.

11. The mountable smart device of claim 1, wherein the horizontal clamp and the vertical clamp each include a spring that biases each inward.

\* \* \* \* \*